(12) United States Patent
Hurwitz

(10) Patent No.: US 8,555,411 B2
(45) Date of Patent: Oct. 8, 2013

(54) LOCKING MOBILE DEVICES IN A PERSONAL AREA NETWORK (PAN)

(75) Inventor: Roger A. Hurwitz, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1322 days.

(21) Appl. No.: 10/743,046

(22) Filed: Dec. 23, 2003

(65) Prior Publication Data

US 2005/0138356 A1  Jun. 23, 2005

(51) Int. Cl.
| | | |
|---|---|---|
| G06F 1/26 | (2006.01) | |
| G06F 11/00 | (2006.01) | |
| G06F 21/00 | (2013.01) | |
| G06F 7/04 | (2006.01) | |
| G06F 12/00 | (2006.01) | |
| G06F 12/14 | (2006.01) | |

(52) U.S. Cl.
USPC ............... 726/34; 726/3; 726/20; 713/150; 713/155; 713/182; 380/52; 380/265; 380/270; 709/228; 455/456.1; 455/456.4; 455/557

(58) Field of Classification Search
USPC ............... 726/34, 3, 20; 380/270, 52, 265; 709/228; 713/182, 150, 155; 455/456.1, 455/456.4, 557
See application file for complete search history.

(56) References Cited

U.S. PATENT DOCUMENTS

| | | | | |
|---|---|---|---|---|
| 5,796,827 | A * | 8/1998 | Coppersmith et al. | 713/182 |
| 6,189,105 | B1 * | 2/2001 | Lopes | 726/20 |
| 6,269,342 | B1 * | 7/2001 | Brick et al. | 705/20 |
| 6,480,096 | B1 * | 11/2002 | Gutman et al. | 340/5.31 |
| 7,068,294 | B2 * | 6/2006 | Kidney et al. | 715/700 |
| 7,185,360 | B1 * | 2/2007 | Anton et al. | 726/3 |
| 7,313,120 | B2 * | 12/2007 | Ekberg et al. | 370/338 |
| 2004/0030885 | A1 * | 2/2004 | Choi et al. | 713/150 |
| 2004/0203895 | A1 * | 10/2004 | Balasuriya | 455/456.1 |
| 2005/0058108 | A1 * | 3/2005 | Ekberg et al. | 370/338 |
| 2005/0125673 | A1 * | 6/2005 | Cheng et al. | 713/182 |

* cited by examiner

*Primary Examiner* — Edan Orgad
*Assistant Examiner* — Kari Schmidt
(74) *Attorney, Agent, or Firm* — Pillsbury Winthrop Shaw Pittman LLP

(57) ABSTRACT

A mobile device out of range of other devices in a wireless network may be locked to provide security.

22 Claims, 4 Drawing Sheets

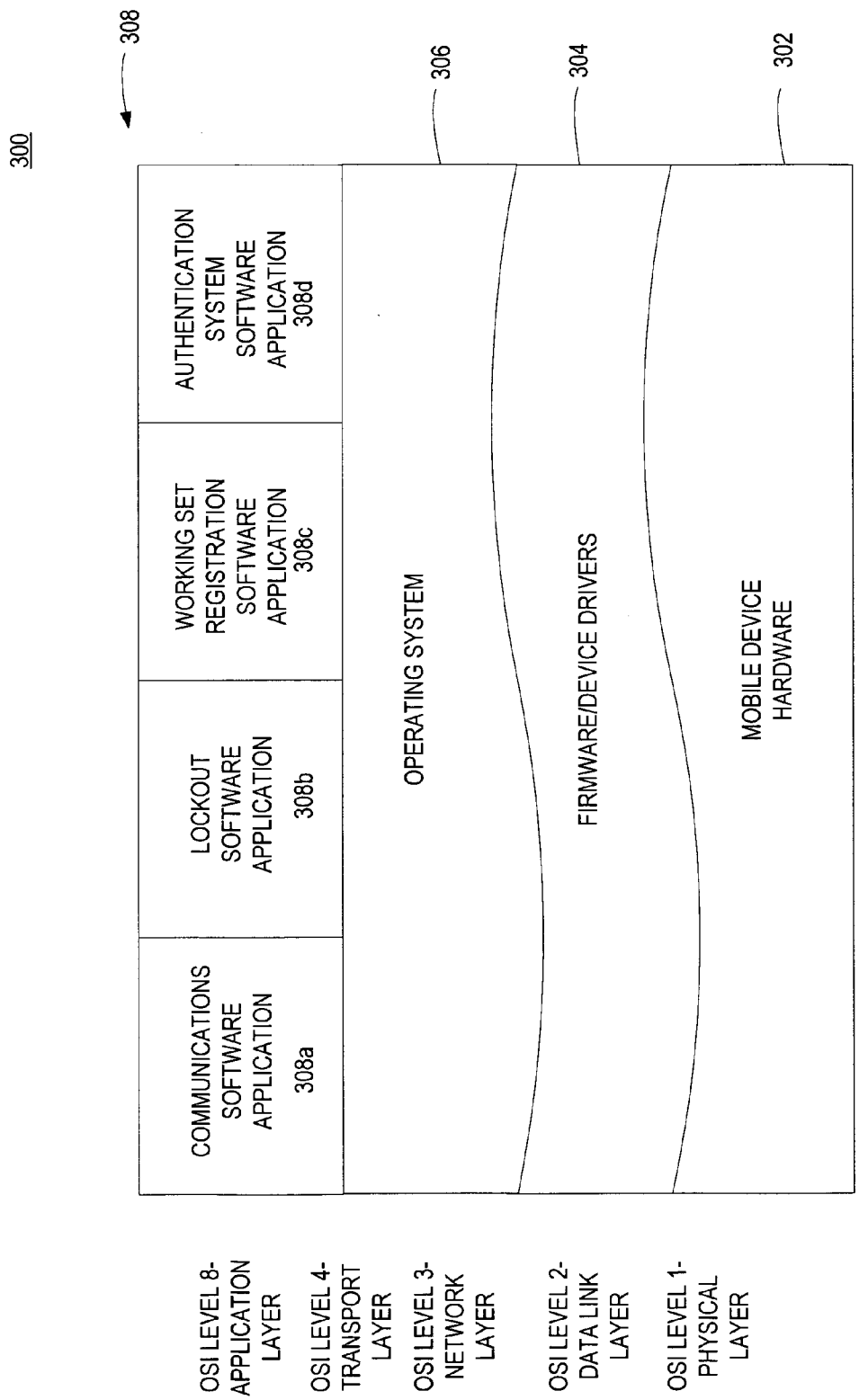

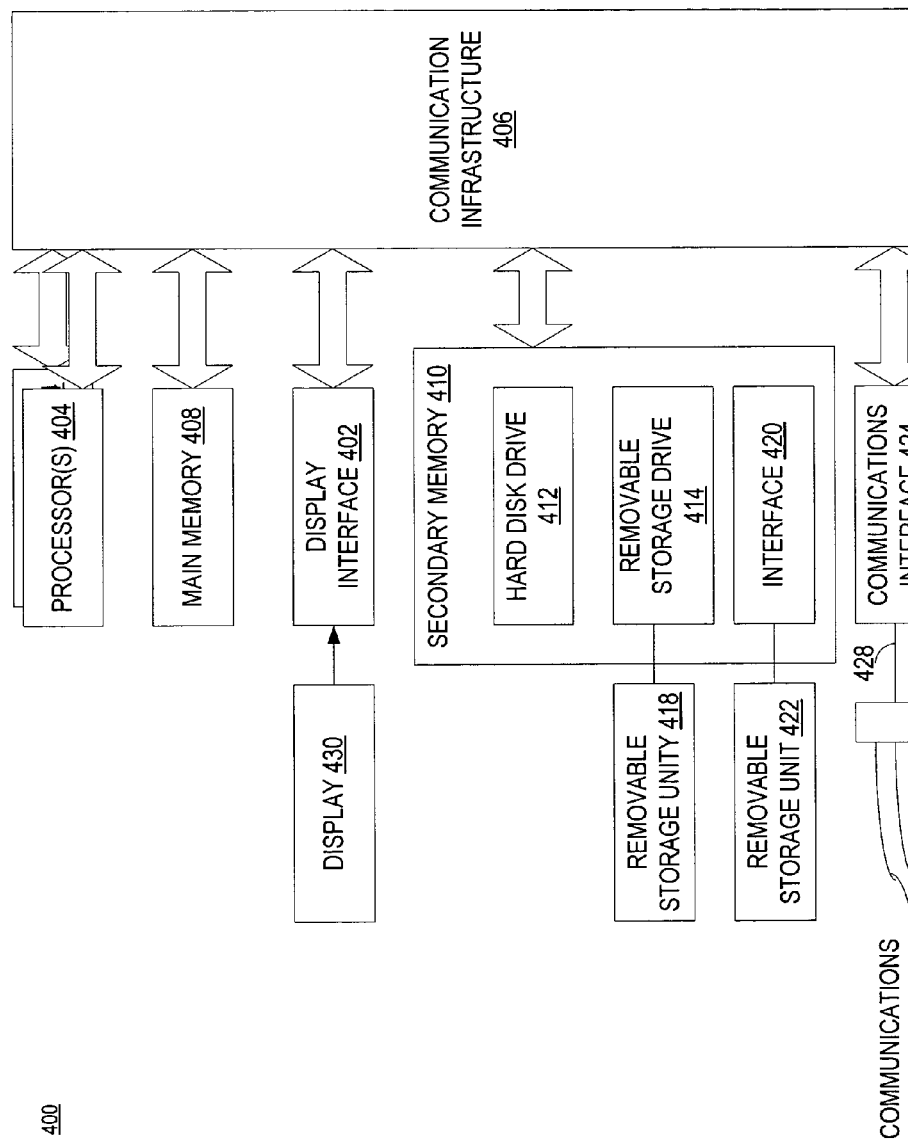

LOCKING MOBILE DEVICES IN A PERSONAL AREA NETWORK (PAN)

BACKGROUND OF THE INVENTION

Users of mobile devices such as, e.g., business professionals and consumers commonly carry a variety of mobile devices with them at any given time. Examples of mobile devices include communications devices and computing devices such as, e.g., mobile phones, personal digital assistants (PDAs), and portable computers including, e.g., (but not limited to) handheld, tablet, subnotebook, notebook, and laptop personal computers (PCs), etc.

Mobile devices are designed for portability. Thus, these mobile devices are compact in size and light in weight, making the mobile devices easy to use. As devices shrink in size, and as more users carry multiple mobile devices at one time, the possibility of theft or loss of one or more of the multiple mobile devices increases. As data capacities grow, the mobile devices are able to store an ever-increasing amount of data including proprietary or confidential information. For example, personal contact information of customers may be stored by a business professional in a personal information manager (PIM) application program. Other information such as, e.g., (but not limited to) proprietary financial, trade secret, and strategic planning information, etc. may be stored on such devices. Thus, loss or misappropriation of such mobile devices may result in a substantial loss of valuable information.

Since these mobile devices are inherently easy to lose, each of the types of mobile devices generally is shipped with security features. An example of a conventional security feature for a mobile device, includes, e.g., but not limited to a password based locking scheme that prevents unauthorized use of the mobile device in the event of loss or theft. Unfortunately, most people do not use these locking schemes. Locking schemes are not generally used for several reasons. For example, because conventionally such locking schemes require separate passwords from other passwords already required by other applications and devices, some users of the mobile devices find their use an inconvenience. Also, conventionally, the locking schemes are not used because the usability of the device may be undermined if the mobile device must be unlocked each time prior to usage.

BRIEF DESCRIPTION OF THE DRAWINGS

Various exemplary features and advantages of the invention will be apparent from the following, more particular description of exemplary embodiments of the present invention, as illustrated in the accompanying drawings wherein like reference numbers generally indicate identical, functionally similar, and/or structurally similar elements. The leftmost digits in the corresponding reference number indicate the drawing in which an element first appears.

FIG. 3 depicts an exemplary embodiment of an architectural platform for a device according to an exemplary embodiment of the present invention; and FIG. 4 depicts an exemplary embodiment of a computer system that may be used in the target or source devices according to an exemplary embodiment of the present invention.

DETAILED DESCRIPTION OF EXEMPLARY EMBODIMENTS OF THE PRESENT INVENTION

Figure 1:
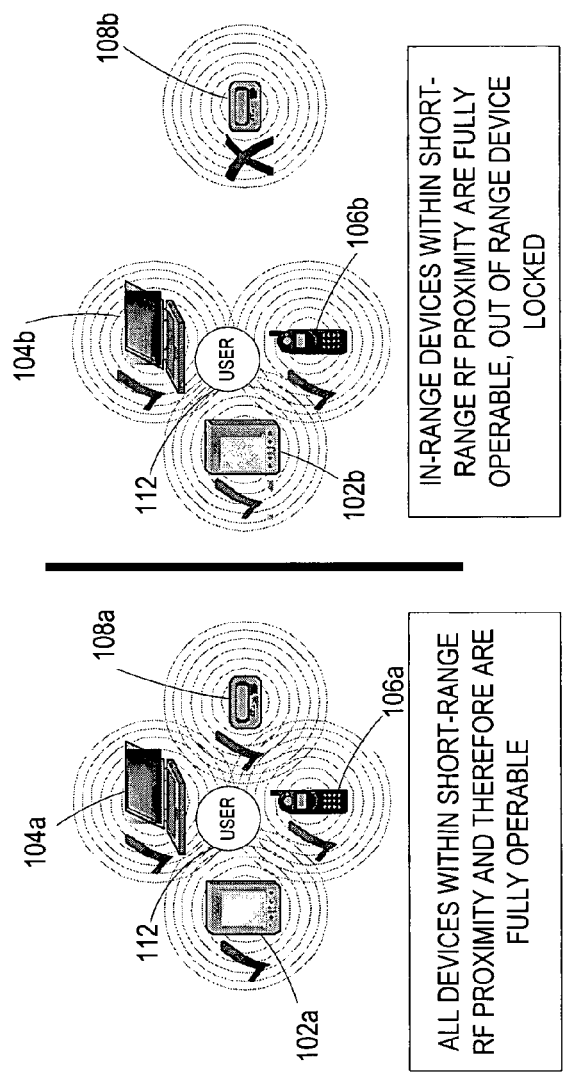
FIG. 1 depicts an exemplary embodiment of a personal area network (PAN) illustrating how a device may be locked when the device is no longer in proximity of other devices of the PAN according to an exemplary embodiment of the present invention.

A preferred exemplary embodiment of the invention is discussed in detail below. While specific exemplary embodiments are discussed, it should be understood that this is done for illustration purposes only. A person skilled in the relevant art will recognize that other components and configurations may be used without parting from the spirit and scope of the invention.

An exemplary embodiment of the present invention overcomes shortcomings of conventional locking solutions. In an exemplary embodiment of the present invention, a personal area network (PAN) may be established for a working set of multiple devices. In an exemplary embodiment, the devices may be mobile devices. In an exemplary embodiment of the present invention, one of the multiple devices in the working set may be locked when taken out of range of the remaining devices of the working set in the event of, e.g., but not limited to, theft or loss of the device. An exemplary embodiment of the present invention may provide security without requiring a user to activate a conventional locking scheme and to authenticate using a password, prior to using the device. Using an exemplary embodiment of the present invention, if the device becomes separated from the remaining devices in the working set, the separated device may be locked automatically. If the separated mobile device returns to being back in range of the remaining devices of the working set (e.g., but not limited to, may be found, or returned), then the device may be unlocked again (e.g., but not limited to automatically, or with entry of authentication information), in an exemplary embodiment.

In an exemplary embodiment of the present invention, a personal area network (PAN) communications network may be formed amongst multiple devices carried by a user. In an exemplary embodiment, the PAN may be a wireless network. In one exemplary embodiment, the PAN may be an ad hoc wireless PAN. The PAN communications network may be used to seamlessly unlock each of the multiple devices for operation. The PAN communications network in an exemplary embodiment may include, e.g., but is not limited to, non-directional short range radio frequency (RF) network technology. Examples of nondirectional short range RF technologies that may be used include, e.g., BLUETOOTH (a wireless communications technology), an Institute of Electrical and Electronics Engineers (IEEE) standard 802.11-compliant wireless local area network (LAN) (such as, e.g., but not limited to a wireless LAN compliant with IEEE std. 802.11a, b, d or g, of, e.g., version IEEE Std 802.11, 1999 Edition; or IEEE Std 802.11a-1999, IEEE Std 802.11b-1999, IEEE Std 802.11b-1999/Cor 1-2001, IEEE Std 802.11d-2001, IEEE Std 802.11-1999 (R2003), and/or IEEE 802.11g-2003, etc.), a shared wireless access protocol (SWAP)-compliant wireless technology, a wireless fidelity (Wi-Fi)-compliant wireless technology, and ultra-wideband (UWB), among others. The mobile devices may communicate over the PAN communications network using, e.g., but not limited to ad hoc networking protocols in such a way that should one of the devices go out of proximity to the other devices (e.g., but not limited to, if the device is lost or stolen) then the device may automatically be placed in a locked mode.

FIG. 1 depicts a diagram 100 illustrating general operation of an exemplary embodiment of a personal area network (PAN) communications network. In an exemplary embodiment, the PAN may be a wireless PAN. In another exemplary embodiment, the PAN may be an ad hoc PAN, i.e., a variable combination of a number of devices, which together may form a working set. Devices 102a, 104a, 106a, and 108a are shown, in an exemplary embodiment, communicating via a communications network 110a in proximity to user 112. Thus, devices 102a-108a together may form an ad hoc wireless PAN.

In FIG. 1, one may see that mobile device 108b becomes separated from the other mobile devices 102b, 104b, and 106b. In an exemplary embodiment, a working set of devices are two or more devices associated with one another such as, e.g., but not limited to, by a common owner. As shown on the right panel of diagram 100, device 108b once separated from the other devices 102b, 104b, and 106b, of a working set, may no longer communicate over communications network 110b because it may have been, e.g., but not limited to, lost, stolen, left behind, or for some other reason become separated from the remaining devices 102b-106b of the working set. According to an exemplary embodiment of the present invention, when device 108b is no longer able to communicate over the communications network 110b, device 108b may cease to operate, or may operate with different functionality. For example, but not limited to, when device 108b becomes separated from its working set, device 108b may be locked, i.e., a locking scheme may be activated, and may require, e.g., but not limited to entry of a password for use. In an exemplary embodiment, communications network 110b may include, e.g., but is not limited to a wireless ad hoc personal area network (PAN). The PAN itself may enable the operation of the invention. Once outside the range of the PAN, the missing device 108b may no longer sense the PAN and may, e.g., but not limited to, activate a locking scheme, and may automatically lock up. In another exemplary embodiment, the PAN may be a wired PAN, and may similarly modify operation of a device, when the device is not in wired communication with other devices.

Mobile Device w/Short Range RF Transceiver

The device 102-108 may provide functionality to the user 112, while on the go. Representative devices 102-108 may include, e.g., but are not limited to PDAs 102, laptop computers 104, phones 106, and pagers 108, etc. For the purpose of the present invention, in addition to their primary capabilities, these devices 102-108 may also have short range RF transceivers based on technologies such as, e.g., but not limited to, BLUETOOTH (a wireless communications technology), IEEE standard 802.11-compliant wireless LAN (such as, e.g., but not limited to, a wireless LAN compliant with IEEE std. 802.11a, b, d or g, of, e.g., version IEEE Std 802.11, 1999 Edition; or IEEE Std 802.11a-1999, IEEE Std 802.11b-1999, IEEE Std 802.11b-1999/Cor 1-2001, IEEE Std 802.11d-2001, IEEE Std 802.11-1999 (R2003), and/or IEEE 802.11g-2003, etc.), a shared wireless access protocol (SWAP)-compliant wireless technology, a wireless fidelity (Wi-Fi)-compliant wireless technology, for local area networking, and Ultra-WideBand (UWB), etc., allowing the devices 102-108 to communicate over a communications network 110. In another exemplary embodiment, the invention may be used with other communications networks such as, e.g., but not limited to, a wired network.

Mobile Device Locking Application Software

Mobile device locking application software in an exemplary embodiment, may reside on the device 102-108, and may be, e.g., but not limited to, embedded or integrated. The software may, in an exemplary embodiment, enable the devices 102-108 to intermittently attempt to communicate with other nearby devices 102-108 of a working set of devices. For example, a device 108 may, e.g., but not limited to, query, or send out a test-signal to other devices 102-106 in the device's working set, and may await a response. The process of attempting to communicate and awaiting an acknowledgment of successful receipt of the communication may be referred to as "pinging" the other mobile devices 102-106 of the working set of device 108. When the device 108 is in-proximity of one or more of the other devices 102-106 of user 112, then a communication such as, e.g., but not limited to, a response may be received at the device 108 from one of the other devices 102-106 of the working set of device 108. So long as device 108a may successfully ping one or more of the companion devices 102a-106a of the working set of device 108a, then the device 108a may remain in or be placed in a convenience mode, such as, e.g., but not limited to, an unlocked state, i.e., may operate, e.g., but not limited to, without activation of a locking scheme. In an exemplary embodiment, in the unlocked state, a convenience mode, the device 108a may be allowed to perform its main operations without restriction of, e.g., but not limited to a password or other security feature. Once the device 108b is taken out of range of the other devices 102b-106b of the working set, then the software on the device 108b may be placed in a secure mode such as, e.g., but not limited to, a locked state, i.e., may operate with activation of a locking scheme. For example, if the device 108b is unable to locate any or all of the companion devices 102b-106b upon attempting to ping the devices 102b-106b, then the software on device 108b may, e.g., automatically transition the device 108b into the secure mode or locked state. In an exemplary secure mode or locked state, the user 112 may be asked to enter a password prior to being able to use the device 108b for its intended operation. Alternatively, the "convenience" mode may include, e.g., but not limited to, a lower level of security than a higher level security "secure" mode, but still may include some level of security. For example, the convenience mode could include, e.g., but not limited to, password for security access as compared to, e.g., but not limited to, password access plus biometric authentication for heightened security of secure mode. In another exemplary embodiment, other levels of security may be provided depending upon particular criterion. For example, the user 112 may be asked to provide an authentication such as, e.g., a biometric or other indication of the user's identity.

In an exemplary embodiment, secure mode may be a first security level and convenience mode may be a second security level. In another exemplary embodiment, secure mode may include a locked state, and convenience mode may include an unlocked state. In another exemplary embodiment, convenience mode may be, e.g., but not limited to, a different, a lower, or higher level of security than secure mode. In yet another exemplary embodiment, convenience mode may be a similar level of security to secure mode, but operation in secure mode may, e.g., but not limited to, otherwise differ from operation in convenience mode.

Figure 2:
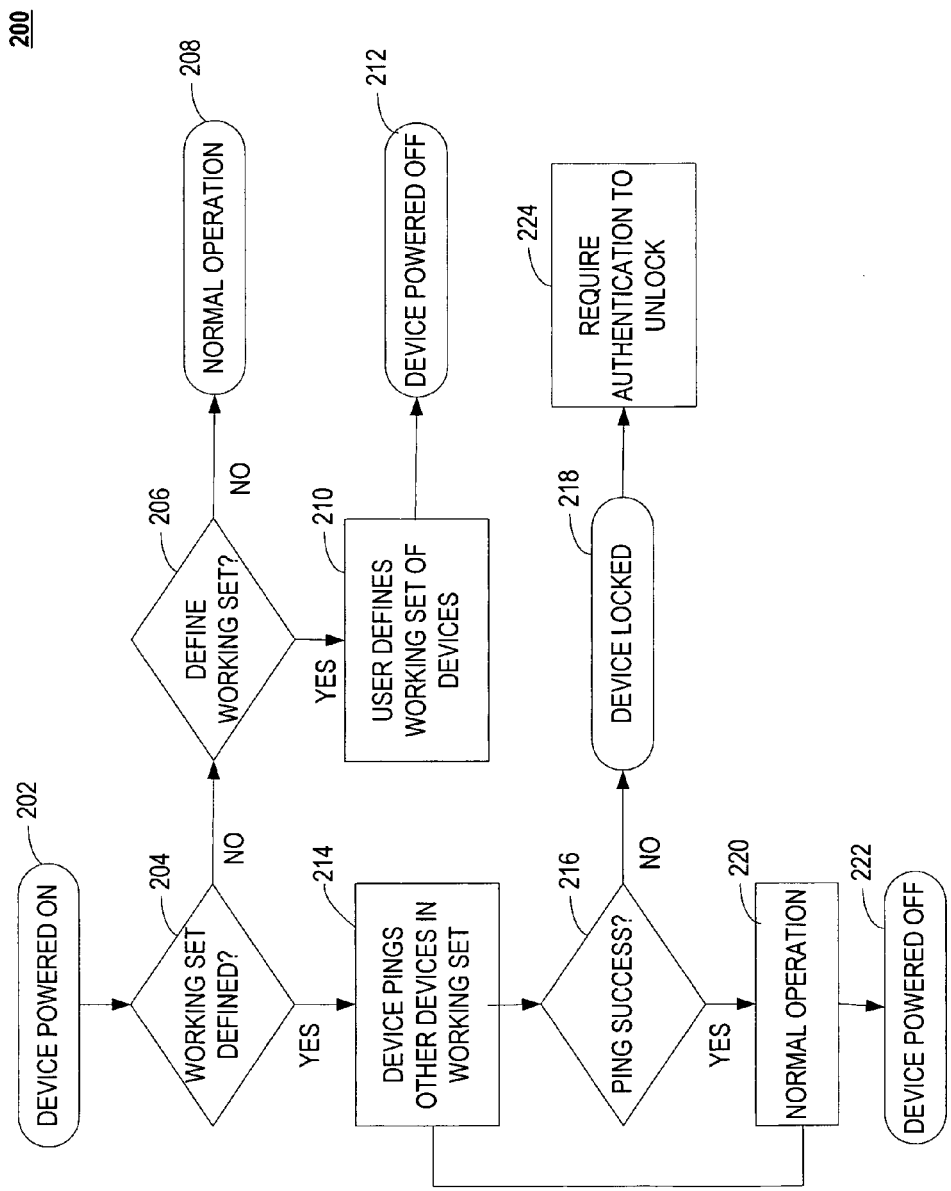
FIG. 2 depicts an exemplary embodiment of a flow diagram illustrating an exemplary process of registering a group of devices in a working set, and locking a device that may be removed from the proximity of the remaining devices from the group of devices.

FIG. 2 depicts an exemplary embodiment of a flow diagram 200 illustrating an exemplary process according to the present invention. The following description may also refer to elements shown in FIG. 1. Flow diagram 200 may begin with the device being powered on in 202.

In 204, flow diagram 200 may determine whether a working set (i.e., a group of associated devices 102-108) has been defined and if so, may proceed to 214 (see below). If no working set has been defined, then flow diagram 200 may continue with 206.

In 206, a user 112 may be prompted whether to define a working set. Alternatively, the user 112 may be provided an optional feature selectable to define a working set. If the user 112 chooses to define a working set, then flow diagram 200 may continue with 210. If the user does not choose to define a working set, then flow diagram 200 may continue with 208.

In 208, since the user 112 may have chosen not to define a working set, devices 102-108 may proceed to operate normally, without the benefit of the locking feature according to the exemplary embodiment of the present invention.

In 210, since the user 112 may have selected to define a working set, one or more of the devices 102-108 may be registered as a working set. For example, (but not limited to) a database table may be created listing a group of related devices identified by, e.g., (but not limited to) an internet protocol address or other identifier. The working set definition process may be automated. For example, if a device has an infrared (IR) communications capability, the device may be brought in proximity of another IR communications capable device and may, via a selection of a software option, be linked into a working set. In another exemplary embodiment, defining a working set may be similar to defining a domain of a network. As already noted, a working set may include two or more devices 102-108. In one exemplary embodiment, devices 102-108 may be in a peer-to-peer network relationship. In another exemplary embodiment, the devices 102-108 may be arranged in hierarchical, or client server relationship. As shown, in 210 the working set may continue to be defined until the device is powered off in 212.

In 212, the device 212 upon power off may end defining the working set of devices.

In 214, assuming a working set has been defined, the device 102-108 may, when activated, attempt to communicate with one or more of the other devices 102-108 in the defined working set. In an exemplary embodiment, a device 102-108 may, when activated, e.g., but not limited to, ping all the other devices 102-108 of a defined working set. From 214, flow diagram 200 may continue with 216.

In 216, if the ping of 214 is successful, meaning the device 108a has remained in proximity of one or more of the other devices 102a-106a in the working set of device 108a, then flow diagram 200 may continue with 220, leaving the device 108a in an unlocked state, or convenience mode. On the other hand, if the device 108b is unsuccessful in pinging one or more of the devices 102b-106b in the working set of device 108b, then flow diagram 200 may continue with 218, placing the device 108b in a locked state, or a secure mode.

In 220, since a ping from 108a to the other devices 102a-106a in the working set in 214 resulted in a successful ping, i.e., an attempted communication from device 108a was successfully received and acknowledged by one or more of device 102a-106a, then it may be assumed that the device 108 may be within range of the other devices 102-106 of the working set and the device 108 may continue to operate normally in convenience mode, and flow diagram 200 may continue by looping back to 214. The device 102-108 may continue to operate normally until the device is powered off, as indicated in 222.

In 218, where a ping from the device 108b to devices 102b-106b in 214 is unsuccessful, then the device 108b, which is not able to ping the remaining devices 102b-106b, may then, in an exemplary embodiment, be placed in secure mode. For example, but not limited to, secure mode may activate a locking scheme. Alternatively, in another example of a secure mode the user 112, e.g., but not limited to, may be prompted to enter a password or otherwise authenticate himself, such as, e.g., but not limited to by use of a biometric or other identification, prior to obtaining access to the operation of device 108b. From 218, in an exemplary embodiment, flow diagram 200 may continue with 224.

In an exemplary embodiment of the present invention, whenever the device 108 is activated, the device 108 may try to find (i.e., ping) the other devices 102-106 in the working set of the device 108, and if unsuccessful, then the device 108b may assume it has been misplaced or stolen, and may enter a locked state, i.e., a secure mode.

In 224, in an exemplary embodiment, following locking of the device 108b that is out of proximity of the remaining devices 102-106 of a working set, the device 108b may prompt the user to enter an authentication method to allow normal operation of the device 108a. For example, the device 106d may be locked and prompt the user 112 to, e.g., but not limited to, type a password in order for the user 112 to gain access to operation of the device 108b. Alternatively, some other form of user authentication may be used. For example, but not limited to, a user 112 may authenticate by correctly responding to a prompted inquiry such as a request for a password. In another exemplary embodiment, another authentication method may be used, such as, e.g., but not limited to, capture of a biometric, or other identifier.

Unlike conventional password authentication approaches, the present invention may operate transparently to the user 112, apart from, possibly, a one-time configuration registration process for defining a working set of devices 102-108.

A unique device identifier of devices 102-108 within the PAN working set, may serve as a locking mechanism in lieu of any dedicated security token. So long as the user 112 carries more than one device 102-108, the security model described in the exemplary embodiment of the present invention may work.

In the event that a user 112 carries only one device 108b, intentionally, or unintentionally, since the device 108b will not be in proximity of any of the other devices 102b-106b, then the user 112 may find that the device 108b is in a locked state, i.e., in secure mode, and may need to enter a password or other authentication to operate the device while in the locked state.

FIG. 3 depicts a diagram 300 illustrating an exemplary operating environment of an exemplary embodiment of the present invention. Diagram 300 includes hardware 302 at the International Standards Organization (ISO) Open Systems Interoperability (OSI) layer 1, i.e., the physical layer. A firmware and/or device driver layer 304 may lie on top of hardware layer 302 and may include, e.g. OSI layer 2 components in an exemplary embodiment. An operating system layer 306 may lay on top of the lower OSI layers and in an exemplary embodiment may include components at OSI layers 1, 2, 3, 4, and 8. Applications 308 may operate at the OSI layer 8, applications layer. Exemplary software application programs may include, e.g., but not limited to, applications 308 including communications software application 308a, a lockout software application 308b, a working set registration software application 308c, and an authentication system software application 308d providing authentication using, e.g., but not limited to, biometrics, finger prints, publications, etc.

The software of the present invention may be offered in combination with a wireless chip set such as, e.g., but not limited to the INTEL® XSCALE® chip set platforms for, e.g., but not limited to, handhelds and handsets. The present invention may be a core offering for mobile systems and may be integrated into, e.g., but not limited to, the INTEL® PERSONAL INTERNET CLIENT ARCHITECTURE (PCA)® middleware specification. The present invention may also be offered in combination with a mobile Intel architecture (IA) chip set platform since a laptop may commonly be a node within a mobile user's wireless PAN. The present invention may also be offered in combination with short range RF wireless network components such as, e.g., but not limited to, a network interface card (NIC), networking protocols, etc.

FIG. 3 depicts an exemplary embodiment of an exemplary architectural platform for an exemplary device 102-108 according to the present invention.

It is important to note that although in the exemplary embodiment user 112 is described as using multiple devices 102-108, the devices may also include devices which are not mobile, but are to remain in proximity of one another. Also, devices 102-108 as described in the exemplary embodiment represent generally portable computing and communications devices, but may also be used to monitor the proximity of other devices including, e.g., a movable piece of industrial electronic equipment, or the like. The wireless communication technologies used to implement the communications network as described in the exemplary embodiment include short range radio frequency (RF) technology, but other wireless communications technologies may be equally used such as, e.g., but not limited to, an advanced mobile phone service (AMPS) cellular phone network, a global system mobile phone (GSM), a personal communications system (PCS), a pager network, a satellite network, a local area network (LAN), a wide area network (WAN), a metropolitan area network (MAN), a multipoint microwave distribution system (MMDS), also know as multi-channel multi-point distribution system or a wireless cable, local multipoint distribution services (LMDS), a cable television (CATV) connection, a satellite connection, a bus connection, an optical connection, a parallel or serial data bus, universal serial bus (USB) connection, or other bus, or other wireless or wired communication system, etc. Although described in terms of a wireless network, it will be apparent to those skilled in the art that functionality of the present invention may be equally applicable to a wired network environment.

FIG. 4 depicts an exemplary embodiment of a computer system that may be used in the target or source devices according to an exemplary embodiment of the present invention. FIG. 4 depicts an exemplary embodiment of a computer system that may be used as a device 102-108. The present invention (or any part(s) or function(s) thereof) may be implemented using hardware, software or a combination thereof and may be implemented in one or more computer systems or other processing systems. In fact, in one exemplary embodiment, the invention may be directed toward one or more computer systems capable of carrying out the functionality such as, e.g., but not limited to computer system 400 shown in FIG. 4. FIG. 4 depicts an exemplary embodiment of a block diagram of exemplary computer system 400. Computer 400 in an exemplary embodiment may be a personal computer (PC) system running an operating system such as, e.g., but not limited to, WINDOWS MOBILE™ for POCKET PC, or MICROSOFT® WINDOWS® NT/98/2000/XP/etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS from APPLE® Corporation of Cupertino, Calif., U.S.A., etc., or any of various versions of UNIX® (a trademark of the Open Group of San Francisco, Calif., USA) including, e.g., but not limited to LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 400 is shown in FIG. 4. Other components of the invention, such as, e.g., but not limited to a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc. may also be implemented using a computer such as, e.g., but limited to that shown in FIG. 4.

The computer system 400 may include, e.g., but not limited to, one or more processors, such as processor(s) 404. The processor 404 may be coupled to a communication infrastructure 406 (e.g., but not limited to, a communications bus, cross-over bar, or network, etc.). Various software embodiments are described in terms of this exemplary computer system. After reading this description, it will become apparent to a person skilled in the relevant art(s) how to implement the invention using other computer systems and/or architectures.

Computer system 400 may include a display interface 402 that may forward graphics, text, and other data from the communication infrastructure 406 (or from a frame buffer not shown) for display on the display unit 430.

The computer system 400 may also include a main memory 408, preferably random access memory (RAM), and a secondary memory 410, etc. The secondary memory 410 may include, for example, but not limited to, a hard disk drive 412 and/or a removable storage drive 414, representing, e.g., but not limited to, a floppy diskette drive, a magnetic tape drive, an optical disk drive, a compact disk drive CD-ROM, etc. The removable storage drive 414 may read from and/or write to a removable storage unit 418 in a well known manner. Removable storage unit 418, also called a program storage device or a computer program product, may represent a floppy disk, magnetic tape, optical disk, compact disk, etc. which may be read from and written to by removable storage drive 414. As will be appreciated, the removable storage unit 418 may include a computer usable storage medium having stored therein computer software and/or data.

In alternative exemplary embodiments, secondary memory 410 may include other similar devices for allowing computer programs or other instructions to be loaded into computer system 400. Such devices may include, for example, but not limited to a removable storage unit 422 and an interface 420. Examples of such may include, e.g., but not limited to, a program cartridge and cartridge interface (such as, e.g., but not limited to those found in video game devices), a removable memory chip (such as, e.g., but not limited to an erasable programmable read only memory (EPROM), or programmable read only memory (PROM) and associated socket), and other removable storage units 422 and interfaces 420, etc., which may allow software and data to be transferred from the removable storage unit 422 to computer system 400.

Computer 400 may also include, e.g., but not limited to, an input device such as, e.g., (but not limited to) a mouse or other pointing device such as a digitizer, and a keyboard or other data entry device (none of which are labeled).

Computer 400 may also include, e.g., but not limited to, output devices, such as, for example, (but not limited to)

display 430, and display interface 402. Computer 400 may include input/output (I/O) devices such as, e.g., communications interface 424, cable 428 and communications path 426. These may include, e.g., (but not limited to) a network interface card, and modems (neither are labeled). Communications interface 424 may allow software and data to be transferred between computer system 400 and external devices. Examples of communications interface 424 may include, e.g., but are not limited to a modem, a network interface card (NIC) (such as, e.g., an Ethernet network card), a communications port, a Personal Computer Memory Card International Association (PCMCIA) slot and card, etc. Software and data transferred via communications interface 424 are in the form of signals 428 which may be electronic, electromagnetic, optical or other signals capable of being received by communications interface 424. These signals 428 are provided to communications interface 424 via a communications path (e.g., channel) 426. This channel 426 carries signals 428 and may be implemented using, e.g., but not limited to, wire or cable, fiber optics, a telephone line, a cellular link, a radio frequency (RF) link and other communications channels, etc.

In this document, the terms "computer program medium" and "computer readable medium" are used to generally refer to media such as, e.g., but not limited to, removable storage drive 414, a hard disk installed in hard disk drive 412, and signals 428, etc. These computer program products may provide software to computer system 400. The invention is directed to such computer program products.

Computer programs (also called computer control logic), including object oriented computer programs, are stored in main memory 408 and/or the secondary memory 410 and/or removable storage units 414, also called computer program products. Such computer programs, when executed, may enable the computer system 400 to perform the features of the present invention as discussed herein. In particular, the computer programs, when executed, may enable the processor 404 to perform the features of the present invention. Accordingly, such computer programs may represent controllers of the computer system 400.

In another exemplary embodiment, the invention may be directed to a computer program product comprising a computer readable medium having control logic (computer software) stored therein. The control logic, when executed by the processor 404, may cause the processor 404 to perform the functions of the invention as described herein. In another exemplary embodiment where the invention may be implemented using software, the software may be stored in a computer program product and loaded into computer system 400 using removable storage drive 414, hard drive 412 or communications interface 424. The control logic (software), when executed by the processor 404, may cause the processor 404 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine to perform the functions described herein will be apparent to persons skilled in the relevant art(s).

In another exemplary embodiment, the invention may be implemented in firmware.

In yet another exemplary embodiment, the invention may be implemented using any combination of hardware, firmware and software.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable storage medium may include any mechanism for storing or transmitting information in a form readable by a machine (e.g., a computer). For example, a machine-readable storage medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wireless personal area networks. A brief discussion of various exemplary wireless network technologies that may be used to implement the embodiments of the present invention now are discussed. Exemplary wireless network types may include, e.g., but not limited to, BLUETOOTH (a wireless communications technology), Infrared Data Association (IrDA), shared wireless access protocol (SWAP), "wireless fidelity" (Wi-Fi), and other IEEE standard 802.11-compliant wireless local area network (LAN), and ultrawideband (UWB), etc.

BLUETOOTH is an emerging wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

Examples of other short-range wireless RF technologies may include shared wireless access protocol (SWAP) developed by Home radio frequency (HomeRF), and wireless fidelity (Wi-Fi), a derivative of IEEE 802.11, advocated by the wireless ethernet compatibility alliance (WECA).

The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to wireless LANs compliant with IEEE std. 802.11a, b, d or g, etc., such as, e.g., but not limited to of version IEEE Std 802.11, 1999 Edition; or IEEE Std 802.11a-1999, IEEE Std 802.11b-1999, IEEE Std 802.11b-1999/Cor 1-2001, IEEE Std 802.11d-2001, IEEE Std 802.11-1999 (R2003), and/or IEEE 802.11g-2003, etc.

Ultrawideband (UWB) is another exemplary wireless communication system. UWB may use small time pulses of energy in the time domain that in the frequency domain may be spread across a very wide bandwidth and may be transmitted at a very low power level that is on the order of noise. The pulses may be encoded to carry information by, e.g., but not limited to, differing timing of arrival of pulses in the time domain.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method comprising:
manually defining a working set comprising a first mobile computing device and a second mobile computing device, the first and second mobile computing devices being configured to communicate via an ad-hoc wireless personal area network (PAN), wherein, in response to being prompted by said first mobile computing device, an infrared (IR) port of said first mobile computing device is configured to communicate a first signal over the PAN to an IR port of said second mobile computing device and the second mobile computing device is configured to communicate an acknowledgment signal over the PAN in response to the received first signal to associate said first mobile computing device and said second mobile computing device with said working set, wherein the first mobile computing device and the second mobile computing device, when associated with the defined working set, each operate in a convenience mode, wherein the convenience mode includes a first functionality level and a first security level for each of the first mobile computing device and the second mobile computing device, wherein the first security level includes one or more authentication operations to obtain access to operate a device;

attempting to communicate with said second mobile computing device of said working set by said first mobile computing device of said working set when said first mobile computing device is activated;

placing said first mobile computing device in a secure mode if said first mobile computing device is unable to communicate with said second mobile computing device of said working set; and maintaining said first mobile computing device in the convenience mode if said first mobile computing device is able to communicate with said second mobile computing device of said working set.

2. The method according to claim 1, wherein operations in said secure mode are selected from the group consisting of:
locking said first device;
disabling said first device;
requiring a password authentication to use said first device;
requiring a biometric authentication to use said first device;
activating a beacon; and
notifying a designee of entry of said first device into said secure mode.

3. The method according to claim 1, wherein said secure mode comprises:
activating a locking scheme on said first device.

4. The method according to claim 1, wherein said convenience mode comprises:
operating said first device without a locking scheme.

5. The method according to claim 1, wherein said wireless PAN is selected from the group consisting of:
a non-directional short range radio frequency (RF) technology network;
a wireless communications technology;
an ultrawideband (UWB) network;
a shared wireless access protocol (SWAP) network;
a wireless fidelity (WI-FI) network; and
an IEEE 802.11a, b, d or g wireless local area network (WLAN) compliant network.

6. The method of claim 1, wherein maintaining said first device in a convenience mode further comprises:
maintaining said first device in a convenience mode based solely on the ability of said first device to communicate with said second device of said working set.

7. The method according to claim 1, wherein the secure mode includes a second functionality level and a second security level, such that the second functionality level is associated with lower device functionality than the first functionality level of the convenience mode, and the second security level is associated with stronger device security than the first security level of the convenience mode.

8. A system comprising:
a first mobile computing device adapted to communicate with a second mobile computing device via an ad-hoc wireless personal area network (PAN) when said first mobile computing device is activated, wherein said first mobile computing device is adapted to manually define a working set comprising said first mobile computing device and said second mobile computing device, in response to being prompted by said first mobile computing device, by communication of a first signal over the PAN between a first infrared (IR) port of said first mobile computing device adapted to communicate with a second IR port of said second mobile computing device, wherein the second mobile computing device is configured to communicate an acknowledgment signal over the PAN in response to the received first signal to associate said first mobile computing device and said second mobile computing device with said working set, wherein the first mobile computing device and the second mobile computing device, when associated with the defined working set, each operate in a convenience mode, wherein the convenience mode includes a first functionality level and a first security level for each of the first mobile computing device and the second mobile computing device, wherein the first security level includes one or more authentication operations to obtain access to operate a device;

wherein said first mobile computing device is adapted to place said first mobile computing device in a secure mode if said first mobile computing device is unable to communicate with said second mobile computing device; and wherein said first mobile computing device is adapted to maintain said first mobile computing device in the convenience mode if said first mobile computing device is able to communicate with said second mobile computing device.

9. The system according to claim 8, wherein said first device when in said secure mode is adapted to perform operations selected from the group consisting of: lock up said first device; disable said first device; require a password authentication to use said first device; require a biometric authentication to use said first device; activate a beacon; and notify a designee of entry of said first device into said secure mode.

10. The system according to claim 8, wherein when in said secure mode, said first device is adapted to activate a locking scheme on said first device.

11. The system according to claim 8, wherein when in said convenience mode, said first device is adapted to operate without a locking scheme.

12. The system according to claim 8, wherein said wireless PAN is selected from the group consisting of:
a non-directional short range radio frequency (RF) technology network;
a wireless communications technology;
an ultrawideband (UWB) network;
a shared wireless access protocol (SWAP) network;
a wireless fidelity (WI-FI) network; and
an IEEE 802.11a, b, d or g wireless local area network (WLAN) compliant network.

13. The system according to claim 8, wherein at least one of said first device and said second device comprises a mobile device.

14. The method of claim 8, wherein said first device is adapted to maintain said first device in a convenience mode further comprises:
wherein said first device is adapted to maintain said first device in a convenience mode based solely on the ability of said first device to communicate with said second device.

15. The system according to claim 8, wherein the secure mode includes a second functionality level and a second security level, such that the second functionality level is associated with lower device functionality than the first functionality level of the convenience mode, and the second security level is associated with stronger device security than the first security level of the convenience mode.

16. A non-transitory machine readable storage medium that stores instructions, which when executed by a computer platform, cause the computing platform to perform operations comprising:
manually defining a working set comprising a first mobile computing device and a second mobile computing device, the first and second mobile computing devices being configured to communicate via an ad-hoc wireless personal area network (PAN), wherein, in response to being prompted by said first mobile computing device, an infrared (IR) port of said first mobile computing device is configured to communicate a first signal over the PAN to an IR port of said second mobile computing device and the second mobile computing device is configured to communicate an acknowledgment signal over the PAN in response to the received first signal to associate said first mobile computing device and said second mobile computing device with said working set, wherein the first mobile computing device and the second mobile computing device, when associated with the defined working set, each operate in a convenience mode, wherein the convenience mode includes a first functionality level and a first security level for each of the first mobile computing device and the second mobile computing device, wherein the first security level includes one or more authentication operations to obtain access to operate a device;
attempting to communicate with said second mobile computing device of said working set by said first mobile computing device of said working set when said first mobile computing device is activated;
placing said first mobile computing device in a secure mode if said first mobile computing device is unable to communicate with said second mobile computing device of said working set; and
maintaining said first mobile computing device in the convenience mode if said first mobile computing device is able to communicate with said second mobile computing device of said working set.

17. The machine readable storage medium according to claim 16, wherein operations in said secure mode are selected from the group consisting of:
locking up said first device;
disabling said first device;
requiring password authentication to use said first device;
requiring biometric authentication to use said first device;
activating a beacon; and
notifying a designee of entry into secure mode of said first device.

18. The machine readable storage medium according to claim 16, wherein said secure mode comprises:
activating a locking scheme on said first device.

19. The machine readable storage medium according to claim 16, wherein said convenience mode comprises:
operating said first device without a locking scheme.

20. The machine readable storage medium according to claim 16, wherein said wireless PAN is selected from the group consisting of:
a non-directional short range radio frequency (RF) technology network;
a wireless communications technology;
an ultrawideband (UWB) network;
a shared wireless access protocol (SWAP) network;
a wireless fidelity (WI-FI) network; and an IEEE 802.11a, b, d or g wireless local area network compliant network.

21. The machine readable storage medium of claim 16, wherein maintaining said first device in a convenience mode further comprises:

maintaining said first device in a convenience mode based solely on the ability of said first device to communicate with said second device of said working set.

22. The machine readable storage medium of claim 16, wherein the secure mode includes a second functionality level and a second security level, such that the second functionality level is associated with lower device functionality than the first functionality level of the convenience mode, and the second security level is associated with stronger device security than the first security level of the convenience mode.

* * * * *